United States Patent
Sedukhin et al.

(10) Patent No.: US 8,099,720 B2
(45) Date of Patent: Jan. 17, 2012

(54) TRANSLATING DECLARATIVE MODELS

(75) Inventors: Igor Sedukhin, Issaquah, WA (US); Leo S. Vannelli, III, North Bend, WA (US); Girish Mittur Venkataramanappa, Redmond, WA (US); Sumit Mohanty, Redmond, WA (US); Cristian S. Salvan, Redmond, WA (US); Anubhav Dhoot, Bothell, WA (US); Rama Rao Raghavendra Rao, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 918 days.

(21) Appl. No.: 11/925,201

(22) Filed: Oct. 26, 2007

(65) Prior Publication Data

US 2009/0113437 A1    Apr. 30, 2009

(51) Int. Cl.
*G06F 9/45*    (2006.01)

(52) U.S. Cl. ........ 717/139; 717/104; 717/108; 717/146; 717/168; 717/170; 719/322

(58) Field of Classification Search ................. 717/104, 717/107, 108, 117, 139, 146, 168–178; 719/310, 719/315, 316, 332
See application file for complete search history.

(56) References Cited

U.S. PATENT DOCUMENTS

| | | | |
|---|---|---|---|
| 4,751,635 A | 6/1988 | Kret | |
| 5,423,003 A | 6/1995 | Berteau | |
| 5,602,991 A | 2/1997 | Berteau | |
| 5,655,081 A | 8/1997 | Bonnell | |
| 5,764,241 A * | 6/1998 | Elliott et al. | 345/473 |
| 5,809,266 A | 9/1998 | Touma | |
| 5,893,083 A | 4/1999 | Eshghi et al. | |
| 5,913,062 A | 6/1999 | Vrvilo et al. | |
| 5,937,388 A | 8/1999 | Davis et al. | |
| 5,958,010 A | 9/1999 | Agarwal | |
| 6,005,849 A | 12/1999 | Roach et al. | |
| 6,026,404 A | 2/2000 | Adunuthula | |
| 6,055,363 A | 4/2000 | Beals et al. | |
| 6,070,190 A | 5/2000 | Reps | |
| 6,167,538 A | 12/2000 | Neufeld et al. | |
| 6,225,995 B1 | 5/2001 | Jacobs | |
| 6,230,309 B1 * | 5/2001 | Turner et al. | 717/107 |
| 6,247,056 B1 | 6/2001 | Chou | |
| 6,263,339 B1 | 7/2001 | Hirsch | |

(Continued)

FOREIGN PATENT DOCUMENTS

EP    0733967    9/1996

(Continued)

OTHER PUBLICATIONS

D. Raymer et al.;End-to-end model driven policy based network management; 2006-computer.org; pp. 1-4.*

(Continued)

*Primary Examiner* — Anna Deng
*Assistant Examiner* — Satish Rampuria
(74) *Attorney, Agent, or Firm* — Workman Nydegger

(57) ABSTRACT

The present invention extends to methods, systems, and computer program products for translating declarative models. Embodiments of the present invention facilitate processing declarative models to perform various operations on applications, such as, for example, application deployment, application updates, application control such as start and stop, application monitoring by instrumenting the applications to emit events, and so on. Declarative models of applications are processed and realized onto a target environment, after which they can be executed, controlled, and monitored.

20 Claims, 8 Drawing Sheets

U.S. PATENT DOCUMENTS

| | | |
|---|---|---|
| 6,279,009 B1 | 8/2001 | Smirnov et al. |
| 6,330,717 B1 | 12/2001 | Raverdy |
| 6,334,114 B1 | 12/2001 | Jacobs |
| 6,336,217 B1 | 1/2002 | D'Anjou et al. |
| 6,342,907 B1 | 1/2002 | Petty |
| 6,415,297 B1 | 7/2002 | Leymann et al. |
| 6,477,665 B1 | 11/2002 | Bowman-Amuah |
| 6,618,719 B1 | 9/2003 | Andrei |
| 6,640,241 B1 | 10/2003 | Ozzie |
| 6,654,783 B1 | 11/2003 | Hubbard |
| 6,662,205 B1 | 12/2003 | Bereiter |
| 6,697,877 B1 | 2/2004 | Martin |
| 6,710,786 B1 | 3/2004 | Jacobs |
| 6,715,145 B1 | 3/2004 | Bowman-Amuah |
| 6,718,535 B1 | 4/2004 | Underwood |
| 6,801,818 B2 | 10/2004 | Kopcha |
| 6,847,970 B2 | 1/2005 | Keller et al. |
| 6,854,069 B2 | 2/2005 | Kampe |
| 6,886,024 B1 | 4/2005 | Fujita |
| 6,907,395 B1 | 6/2005 | Hunt |
| 6,931,644 B2 | 8/2005 | Riosa |
| 6,934,702 B2 | 8/2005 | Faybishenko |
| 6,941,341 B2 | 9/2005 | Logston |
| 7,051,098 B2 | 5/2006 | Masters |
| 7,055,143 B2 | 5/2006 | Ringseth et al. |
| 7,065,579 B2 | 6/2006 | Traversat |
| 7,072,807 B2 | 7/2006 | Brown |
| 7,072,934 B2 | 7/2006 | Helgeson |
| 7,079,010 B2 | 7/2006 | Champlin |
| 7,085,837 B2 | 8/2006 | Kimbrel |
| 7,096,258 B2 | 8/2006 | Hunt |
| 7,103,874 B2 | 9/2006 | McCollum |
| 7,130,881 B2 | 10/2006 | Volkov et al. |
| 7,150,015 B2 | 12/2006 | Pace et al. |
| 7,155,380 B2 | 12/2006 | Hunt |
| 7,155,466 B2 | 12/2006 | Rodriguez |
| 7,162,509 B2 | 1/2007 | Brown et al. |
| 7,168,077 B2 | 1/2007 | Kim |
| 7,174,359 B1 | 2/2007 | Hamilton, II et al. |
| 7,178,129 B2 | 2/2007 | Katz |
| 7,200,530 B2 | 4/2007 | Brown |
| 7,219,351 B2 | 5/2007 | Bussler et al. |
| 7,263,689 B1 | 8/2007 | Edwards et al. |
| 7,379,999 B1 | 5/2008 | Zhou et al. |
| 7,383,277 B2 | 6/2008 | Gebhard et al. |
| 7,487,080 B1 * | 2/2009 | Tocci et al. ............. 703/22 |
| 7,512,707 B1 | 3/2009 | Manapragada |
| 7,703,075 B2 | 4/2010 | Das |
| 7,761,844 B2 | 7/2010 | Bove |
| 7,796,520 B2 | 9/2010 | Poustchi |
| 7,797,289 B2 | 9/2010 | Chan et al. |
| 7,844,942 B2 * | 11/2010 | Eilam et al. ............. 717/104 |
| 2002/0035593 A1 | 3/2002 | Salim et al. |
| 2002/0038217 A1 | 3/2002 | Young |
| 2002/0099818 A1 | 7/2002 | Russell |
| 2002/0111841 A1 | 8/2002 | Leymann |
| 2002/0120917 A1 | 8/2002 | Abrari et al. |
| 2002/0133504 A1 | 9/2002 | Vlahos et al. |
| 2002/0135611 A1 | 9/2002 | Deosaran |
| 2002/0147515 A1 | 10/2002 | Fava et al. |
| 2002/0147962 A1 | 10/2002 | Hatanaka |
| 2002/0198734 A1 | 12/2002 | Greene |
| 2003/0005411 A1 | 1/2003 | Gerken |
| 2003/0061342 A1 | 3/2003 | Abdelhadi |
| 2003/0084156 A1 | 5/2003 | Graupner et al. |
| 2003/0135384 A1 | 7/2003 | Nguyen |
| 2003/0149685 A1 | 8/2003 | Trossman |
| 2003/0182656 A1 | 9/2003 | Leathers |
| 2003/0195763 A1 | 10/2003 | Gulcu |
| 2003/0208743 A1 | 11/2003 | Chong |
| 2004/0034850 A1 | 2/2004 | Burkhardt |
| 2004/0046785 A1 | 3/2004 | Keller |
| 2004/0078461 A1 | 4/2004 | Bendich et al. |
| 2004/0088350 A1 | 5/2004 | Early |
| 2004/0102926 A1 | 5/2004 | Adendorff |
| 2004/0148184 A1 | 7/2004 | Sadiq |
| 2004/0162901 A1 | 8/2004 | Mangipudi |
| 2004/0249972 A1 | 12/2004 | White |
| 2005/0005200 A1 | 1/2005 | Matena et al. |
| 2005/0010504 A1 | 1/2005 | Gebhard et al. |
| 2005/0011214 A1 | 2/2005 | Schwetfuehrer |
| 2005/0055692 A1 | 3/2005 | Lupini et al. |
| 2005/0071737 A1 | 3/2005 | Adendorff |
| 2005/0074003 A1 | 4/2005 | Ball |
| 2005/0091227 A1 | 4/2005 | McCollum et al. |
| 2005/0120106 A1 | 6/2005 | Albertao |
| 2005/0125212 A1 | 6/2005 | Hunt et al. |
| 2005/0132041 A1 | 6/2005 | Kundu |
| 2005/0137839 A1 | 6/2005 | Mansurov |
| 2005/0155042 A1 | 7/2005 | Kolb et al. |
| 2005/0165906 A1 | 7/2005 | Deo et al. |
| 2005/0182750 A1 | 8/2005 | Krishna et al. |
| 2005/0188075 A1 | 8/2005 | Dias |
| 2005/0216831 A1 | 9/2005 | Guzik |
| 2005/0251546 A1 | 11/2005 | Pichetti et al. |
| 2005/0261875 A1 | 11/2005 | Shrivastava |
| 2005/0268307 A1 | 12/2005 | Gates et al. |
| 2005/0278702 A1 | 12/2005 | Koyfman |
| 2005/0283518 A1 | 12/2005 | Sargent |
| 2006/0010142 A1 | 1/2006 | Kim |
| 2006/0010164 A1 | 1/2006 | Netz |
| 2006/0013252 A1 | 1/2006 | Smith |
| 2006/0036743 A1 | 2/2006 | Deng |
| 2006/0064460 A1 | 3/2006 | Sugawara |
| 2006/0070066 A1 | 3/2006 | Grobman |
| 2006/0070086 A1 | 3/2006 | Wang |
| 2006/0074730 A1 | 4/2006 | Shukla et al. |
| 2006/0074734 A1 | 4/2006 | Shukla |
| 2006/0095443 A1 | 5/2006 | Kumar |
| 2006/0123389 A1 | 6/2006 | Kolawa et al. |
| 2006/0123412 A1 | 6/2006 | Hunt |
| 2006/0155738 A1 | 7/2006 | Baldwin |
| 2006/0161862 A1 | 7/2006 | Racovolis et al. |
| 2006/0173906 A1 | 8/2006 | Chu et al. |
| 2006/0206537 A1 | 9/2006 | Chiang |
| 2006/0230314 A1 | 10/2006 | Sanjar |
| 2006/0235859 A1 | 10/2006 | Hardwick |
| 2006/0236254 A1 | 10/2006 | Mateescu |
| 2006/0242195 A1 | 10/2006 | Bove |
| 2006/0265231 A1 | 11/2006 | Fusaro et al. |
| 2006/0277323 A1 | 12/2006 | Joublin |
| 2006/0277437 A1 | 12/2006 | Ohtsuka |
| 2006/0294502 A1 | 12/2006 | Das |
| 2006/0294506 A1 | 12/2006 | Dengler et al. |
| 2007/0005283 A1 | 1/2007 | Blouin |
| 2007/0005299 A1 | 1/2007 | Haggerty |
| 2007/0006122 A1 | 1/2007 | Bailey et al. |
| 2007/0016615 A1 | 1/2007 | Mohan et al. |
| 2007/0033088 A1 | 2/2007 | Aigner et al. |
| 2007/0050237 A1 | 3/2007 | Tien |
| 2007/0050483 A1 | 3/2007 | Bauer et al. |
| 2007/0061776 A1 | 3/2007 | Ryan et al. |
| 2007/0067266 A1 | 3/2007 | Lomet |
| 2007/0088724 A1 | 4/2007 | Demiroski |
| 2007/0089117 A1 | 4/2007 | Samson |
| 2007/0094350 A1 | 4/2007 | Moore |
| 2007/0112847 A1 | 5/2007 | Dublish |
| 2007/0174228 A1 | 7/2007 | Folting |
| 2007/0174815 A1 | 7/2007 | Chrysanthakopoulos et al. |
| 2007/0179823 A1 | 8/2007 | Bhaskaran |
| 2007/0208606 A1 | 9/2007 | MacKay |
| 2007/0220177 A1 | 9/2007 | Kothari |
| 2007/0226681 A1 | 9/2007 | Thorup |
| 2007/0233879 A1 | 10/2007 | Woods |
| 2007/0244904 A1 | 10/2007 | Durski |
| 2007/0245004 A1 | 10/2007 | Chess |
| 2007/0277109 A1 | 11/2007 | Chen |
| 2007/0294364 A1 | 12/2007 | Mohindra et al. |
| 2008/0005729 A1 | 1/2008 | Harvey |
| 2008/0010631 A1 | 1/2008 | Harvey et al. |
| 2008/0127052 A1 | 5/2008 | Rostoker |
| 2008/0209414 A1 | 8/2008 | Stein |
| 2008/0244423 A1 | 10/2008 | Jensen-Pistorius |
| 2009/0049165 A1 | 2/2009 | Long et al. |
| 2009/0187662 A1 | 7/2009 | Manapragada et al. |
| 2009/0197662 A1 | 8/2009 | Manapragada |
| 2009/0265458 A1 | 10/2009 | Baker |

| | | | |
|---|---|---|---|
| 2010/0005527 | A1 | 1/2010 | Jeon |
| 2011/0179151 | A1 | 7/2011 | Sedukhin |
| 2011/0219383 | A1 | 9/2011 | Bhaskar |

FOREIGN PATENT DOCUMENTS

| | | |
|---|---|---|
| EP | 1770510 | 4/2007 |
| WO | WO 00/38091 | 6/2000 |
| WO | 0124003 | 4/2001 |
| WO | WO0227426 A2 | 4/2002 |
| WO | 2007072501 | 6/2007 |

OTHER PUBLICATIONS

R.M. Argent et al.; Development of multi-framework model components; 2004; Citeseer; pp. 1-6.*
U.S. Appl. No. 11/925,184, filed Jan. 14, 2011, Office Action.*
U.S. Appl. No. 12/105,083, filed Apr. 17, 2008 (Not Yet Published).
U.S. Appl. No. 11/740,737, filed Feb. 10, 2011, Office Action.
Office Action dated Mar. 2, 2010 cited in U.S. Appl. No. 11/771,816.
Office Action dated Mar. 18, 2010 cited in U.S. Appl. No. 11/740,737.
U.S. Appl. No. 11/925,079, filed Mar. 1, 2011, Notice of Allowance.
Office Action dated Apr. 5, 2010 cited in U.S. Appl. No. 11/771,827.
Office Action dated Apr. 13, 2010 cited in U.S. Appl. No. 11/925,326.
U.S. Appl. No. 11/740,737, filed Apr. 29, 2011, Notice of Allowance.
U.S. Appl. No. 11/925,184, filed Apr. 25, 2011, Office Action.
U.S. Appl. No. 11/925,326, filed Jul. 22, 2010, Notice of Allowance Documents.
U.S. Appl. No. 11/925,079, filed Sep. 1, 2010, Office Action.
U.S. Appl. No. 11/740,737, filed Sep. 13, 2010, Office Action.
Ivan, A.-A, et al., "Partionable services: A framework for seamlessly adapting distributed applications to heterogeneous environments", High Performance Distributed Computing, 2002. HPDC-11 2002. Proceedings. 11th IEEE International Symposium, 1 page.
Urban, Susan D., et al., "Active Declarative Integration Rules for Developing Distributed Multi-Tiered Applications", 3 pages.
Bischoff, Urs, et al., "Programming the Ubiquitous Network: A Top-Down Approach" System Support for Ubiquitous Computing Workshop (UbiSys'06), Orange County, USA, Sep. 2006, 8 pages.
OSLO>Suite 2006, "Oslo Suite is the leading platform for designing, building and executing adaptive business solutions", http://www.oslo-software.com/en/product.php.
U.S. Appl. No. 11/844,177, Aug. 23, 2007, Sedukhin.
U.S. Appl. No. 11/740,737, Apr. 26, 2007, Sedukhin.
U.S. Appl. No. 11/771,827, Jun. 29, 2007, Sedukhin.
U.S. Appl. No. 11/771,816, filed Jun. 29, 2007, Sedukhin.
U.S. Appl. No. 11/925,079, filed Oct. 26, 2007, Bhaskar.
U.S. Appl. No. 11/925,680, filed Oct. 26, 2007, Sedukhin.
U.S. Appl. No. 11/925,591, filed Oct. 26, 2007, Sedukhin.
U.S. Appl. No. 11/925,067, filed Oct. 26, 2007, Sedukhin.
U.S. Appl. No. 11/925,184, filed Oct. 26, 2007, Voss.
U.S. Appl. No. 11/925,326, filed Oct. 26, 2007, Christensen.
U.S. Appl. No. 60/983,117, filed Oct. 26, 2007, Skierkowski.
Frecon, Emmanuel, et al., "DIVE: a scaleable network architecture for distributed virtual environments", The British Computer Society, The Institution of Electrical Engineers and IOP Publishing Ltd, Mar. 6, 1998, pp. 91-100.
Baldi, Mario, et al., "Exploiting Code Mobility in Decentralized and Flexible Network Management", Lecture Notes in Computer Science, vol. 1219, Proceedings of the First International Workshop on Mobile Agents, pp. 13-26.
Milenkovic, Milan, et al., "Towards Internet Distributed Computing", Sep. 26, 2003, http://m.students.umkc.edu/mpshxf/Towards_IDC.pdf.
"Managing Complexity in Middleware", by Adrian Colyer, Gordon Blair and Awais Rashid, IBM UK Limited, Hursley Park, Winchester, England and Computing Department, Lancaster University, Bailrigg, Lancaster, England, [online] [retrieved on Apr. 20, 2007], 6 pages. Retrieved from the Internet: http://222.aosd.net/2005/workshops/acp4is/past/asp4is03/papers/colyer.pdf.
"User Interface Declarative Models and Development Environments: A Survey", by Paulo Pinheiro Da Silva, Department of Computer Science, University of Manchester, Manchester, England [online] [retrieved on Apr. 20, 2007], 20 pages. Retrieved from the Internet: http://www.cs.utep.edu/paulo/papers/PinheirodaSilva_DSVIS_2000.pdf.
"Architecturing and Configuring Distributed Application with Olan", by R. Balter, L. Bellissard, F. Boyer, M Riveill and J.Y. Vion-Dury, Middleware 98 Conference Report, INRIA, France, [online] [retrieved on Apr. 20, 2007], 15 pages. Retrieved from the Internet: http://www.comp.lancs.ac.uk/computing/middleware98/papers.html.
"A Load Balancing Module for the Apache Web Server", Author Unknown, [online] [retrieved on Apr. 20, 2007], 9 pgs. Retrived from the Internet: http://www.backhand.org/ApacheCon2000/US/mod_backhand_coursenotes.pdf.
"Performance Tuning and Optimization of J2ee Applications on the Jboss Platform", by Samuel Kounev, Bjorn Weis and Alejandro Duchmann, Department of Computer Science, Darmstadt University of Technology, Germany, [online] [retrieved on Apr. 20, 2007], 10 pgs. Retrieved from the Internet: http://www.cl.cam.ac.uk/~sk507/pub/04—cmg—JBoss.pdf.
"Outlier Detection for Fine-Grained Load Balancing in Database Clusters", by Jin Chen, Gokul Soundararajan, Madalin Mihailescu and Cristiana Amza, Department of Computer Science, Department of Electrical and Computer Engineering, University of Toronto, [online] [retrieved on Apr. 20, 2007], 10 pgs. Retrieved from the Internet: http://www.cs.toronto.edu/~jinchen/papers/smdb07.pdf.
Dias, M. Bernardine, et al., "A Real-Time Rover Executive Based on Model-Based Reactive Planning" The 7th International Symposium on Artificial Intelligence, Robotics and Automation in Space, May 2003.
Goble, Carole, et al., "Building Large-scale, Service-Oriented Distributed Systems using Semantic Models", http://www.jisc.ac.uk/media/documents/programmes/capital/grid_standards_above_ogsa.pdf, 21 pages.
Robinson, William N., "Implementing Rule-based Monitors within a Framework for continuous Requirements Monitoring" Proceedings of the 38th Hawaii International Conference on System Sciences, 2005 IEEE, 10 pages.
Maghraoui, Kaoutar EL, et al., "Model Driven Provisionings: Bridging the Gap Between Declarative Object Models and Procedural Provisioning Tools", http://wcl.cs.rpi.edu/papers/middleware06.pdf.
Von, Vorgelet, et al., "Dynamic Upgrade of Distributed Software Components", 2004, 191 pages.
Poslad, Stefan, et al., "The FIPA-OS agent platform: Open Source for Open Standards", Apr. 2000, 17 pages.
Software News, "Progress Software Extends Lead in Distributed SOA" 2007, 6 pages.
Eidson, Thomas M., "A Component-based Programming Model for Composite, Distributed Applications", Institute for Computer Applications in Science and Engineering Hampton, VA, May 2001, 1 page.
Bauer, Michael A., "Managing Distributed Applications and Systems: An Architectural Experiment", Jan. 31, 1997, 46 pages.
Tawfik, Sam, "Composite applications and the Teradata EDW", Extend the capabilities of your enterprise data warehouse with supporting applications, Teradata Magazine online, Archive: vol. 6, No. 4, Dec. 2006, 3 pages.
Alpern, Bowen, et al, "PDS: A Virtual Execution Environment for Software Deployment", 2005, pp. 175-185.
Talcott, Carolyn L., MTCoord 2005 Preliminary Version, "Coordination Models Based on a Formal Model of Distributed Object Reflection", 13 pages.
Leymann, F., et al., "Web Services and Business Process Management", IBM Systems Journal, vol. 41, No. 2, 2002, New Developments in Web Services and E-commerce, 11 pages.
Korb, John T., et al., "Command Execution in a Heterogeneous Environment", 1986 ACM, pp. 68-74.
Albrecht, Jeannie, et al., "Remote Control: Distributed Application Configuration Management, and Visualization with Plush", Proceedings of the Twenty-first USENIX Large Installation System Administration Conference (LISA), Nov. 2007, 16 pages.
Office Action dated Sep. 14, 2009 cited in U.S. Appl. No. 11/740,737.
Office Action dated Oct. 14, 2009 cited in U.S. Appl. No. 11/771,827.
Office Action dated Oct. 1, 2009 cited in U.S. Appl. No. 11/771,816.

Nastel Technologies, Inc., "AutoPilot Business Dashboard Configuration and User's Guide Version 4.4", 2006, AP/DSB 440.001, 82 pages.

TIBCO The Power of NOW, "TIBCO BusinessFactor", 2006, 2 pages.

TIBCO, http://www.tibco.com/software/business_activity_monitoring/businessfactor/default.jsp, Copyright 2000-2007, 2 pages.

"Factal:Edge Enlists CMLgroup to Bring Visualization to Business Performance Management Clients", http://extranet.fractaledge.com/News/PressReleases/2006/060829, 2006, 2 pages.

Shaojie Wang, Synthesizing Operating System Based Device Drivers in Embedded Systems, 2003.

U.S. Appl. No. 11/771,827, filed Nov. 29, 2010, Notice of Allowance.

U.S. Appl. No. 11/925,067, filed Dec. 6, 2010, Notice of Allowance.

Rosenblum, D., and Wolf, A. "A Design Framework for Internet-Scale Event Observation and Notification," ACM SIGSOFT Software Engineering Notes. vol. 22, Issue 6, Nov. 1997. [retrieved on Jun. 12, 2011]. Retrieved from the Internet: <URL:www.acm.org>.

Quentin Limbourg et al: "USIXML: A Language Supporting Multi-path Development of User Interfaces", Engineering Human Computer Interaction and interactive Systems; [Lecture Notes in Computer Science;LNCS], Springer-Verlag, Berlin/Heidelberg, vol. 3425, Jun. 30, 2005 pp. 200-220, CP019009959 ISBN: 978-3-540-26097-4.

Pierre-Alain Muller et al., "Platform Independent Web Application Modeling and Development with Netsilon", Software & Systems Modeling, Springer, Berlin, DE, vol. 4, No. 4, Nov. 1, 2005, pp. 424-442, XP019357229, ISSN: 1619-1374.

Wang L J et al: "Abstract Interface Specification Languages for device-independent Interface Design: Classification, Analysis and Challenges", Pervasive Computing and Applications, 2006 1st International Symposium On, IEEE, PI, Aug. 1, 2006, pp. 241-246.

Jean Vanderdonckt ed - Oscar Pastor et al, "A MDA-Compliant Environment for Developing User Interfaces of information Systems", Advanced Information Systems Engineering; [Lecture Notes in Computer Science;LNCS], Springer-Verlag, Berling, Berlin/Heidelberg, vol. 3520, May 17, 2005, pp. 16-31.

Xiaofeng Yu et al., "Towards a Model Driven Approach to Automatic BPEL Generation", Model Driven Architecture Foundations and Applications; [Lecture Notes in Computer Science;LNCS], Springer Berlin Heidelberg, vol. 4530, Jun. 11, 2007 pp. 204-218.

U.S. Appl. No. 13/077,730, Mail Date Jul. 14, 2011, Office Action.

U.S. Appl. No. 11/925,680, Mail Date Jul. 18, 2011, Office Action.

U.S. Appl. No. 11/925,591, Mail Date Jul. 5, 2011, Office Action.

\* cited by examiner

TRANSLATING DECLARATIVE MODELS

CROSS-REFERENCE TO RELATED APPLICATIONS

N/A.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

As computerized systems have increased in popularity, so have the complexity of the software and hardware employed within such systems. In general, the need for seemingly more complex software continues to grow, which further tends to be one of the forces that push greater development of hardware. For example, if application programs require too much of a given hardware system, the hardware system can operate inefficiently, or otherwise be unable to process the application program at all. Recent trends in application program development, however, have removed many of these types of hardware constraints at least in part using distributed application programs. In general, distributed application programs comprise components that are executed over several different hardware components, often on different computer systems in a tiered environment.

With distributed application programs, the different computer systems may communicate various processing results to each other over a network. Along these lines, an organization will employ a distributed application server to manage several different distributed application programs over many different computer systems. For example, a user might employ one distributed application server to manage the operations of an ecommerce application program that is executed on one set of different computer systems. The user might also use the distributed application server to manage execution of customer management application programs on the same or even a different set of computer systems.

Of course, each corresponding distributed application managed through the distributed application server can, in turn, have several different modules and components that are executed on still other different (and potentially differently configured) computer systems over different (and potentially differently configured) network connections. Thus, while this ability to combine processing power through several different computer systems can be an advantage, there are various complexities associated with distributing application program modules.

For example, conventional distributed application program servers are generally not configured for efficient scalability. That is, most distributed application servers are configured to manage precise instructions of the given distributed application program, such as precise reference and/or component addressing schemes. As such, there is typically a relatively tight coupling between components of an application program. Thus, when an administrator desires to redeploy certain modules or components onto another server or set of computer systems, there is always some (and potentially a significant) possibility of redeployment causing errors to occur (e.g., due to differences in network protocols, system configurations, etc.) These errors can result when messages are not passed onward everywhere they are needed, or if they are passed onward incorrectly.

BRIEF SUMMARY

The present invention extends to methods, systems, and computer program products for translating declarative models. A computer system includes one or more drivers. Each driver is configured to process models for a specified combination of different technologies. The computer system also includes one or more translators. Each translator is configured to process model elements representing objects within a specified technology from among the plurality of different technologies.

In some embodiments, the computer system receives a declarative model along with a command. The declarative model and the command collectively indicate intent to implement the command for an application based on the received declarative model. The computer system identifies a driver that is configured to process declarative models corresponding to the combination of technologies indicated in the received declarative model. The computer system forwards the received declarative model and the command to the identified driver. The identified driver parses the received declarative model to identify model elements and their relationship to one another.

For each identified model element, the computer system identifies a translator configured to translate model elements for the specified technology corresponding to the identified model element. For each identified model element, the computer system sends the model element to the identified translator. For each identified model element, the computer system receives a sequence of actions that are to be performed within the specified technology to partially implement the command for the application. The received sequence of actions is a subset of the total actions that are to be performed to fully implement the command.

The computer system assembles the received sequences of actions for the model elements identified in the declarative model into an execution plan. The received sequence of actions is assembled into the execution plan in a designated order with respect to sequences of actions received for other model elements. The designated order is based on the model element's relationship to other model elements in the received declarative model. The computer system executes the execution plan to implement the command for the application. Execution of the execution plan includes executing the sequences of actions received for each model element in the designated order.

In other embodiments, current and prior execution plans for an application are compared. The results of the comparison are used to derive a new execution plan. Derivation of a new execution plan can include adding, deleting, updating, and reversing actions from the prior execution plan based actions being included or not included in the current execution plan.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
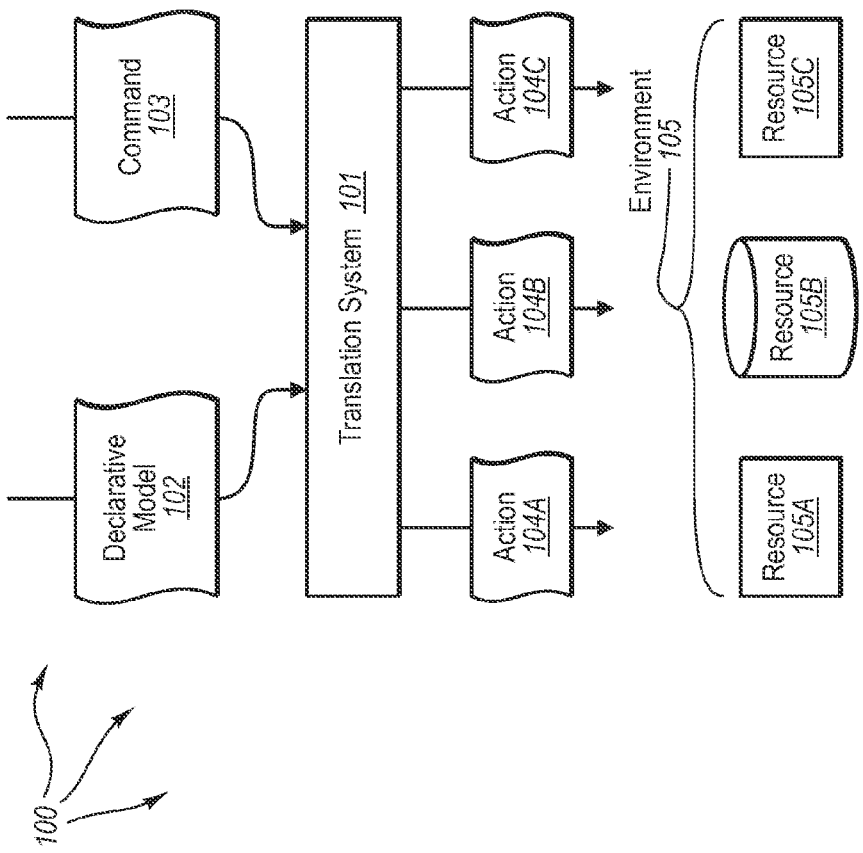
FIG. 1 illustrates an example computer architecture that facilitates translating declarative models.

The present invention extends to methods, systems, and computer program products for translating declarative models. A computer system includes one or more drivers. Each driver is configured to process models for a specified combination of different technologies. The computer system also includes one or more translators. Each translator is configured to process model elements representing objects within a specified technology from among the plurality of different technologies.

In some embodiments, the computer system receives a declarative model along with a command. The declarative model and the command collectively indicate intent to implement the command for an application based on the received declarative model. The computer system identifies a driver that is configured to process declarative models corresponding to the combination of technologies indicated in the received declarative model. The computer system forwards the received declarative model and the command to the identified driver. The identified driver parses the received declarative model to identify model elements and their relationship to one another.

For each identified model element, the computer system identifies a translator configured to translate model elements for the specified technology corresponding to the identified model element. For each identified model element, the computer system sends the model element to the identified translator. For each identified model element, the computer system receives a sequence of actions that are to be performed within the specified technology to partially implement the command for the application. The received sequence of actions is a subset of the total actions that are to be performed to fully implement the command.

The computer system assembles the received sequences of actions for the model elements identified in the declarative model into an execution plan. The received sequence of actions is assembled into the execution plan in a designated order with respect to sequences of actions received for other model elements. The designated order is based on the model element's relationship to other model elements in the received declarative model. The computer system executes the execution plan to implement the command for the application. Execution of the execution plan includes executing the sequences of actions received for each model element in the designated order.

In other embodiments, current and prior execution plans for an application are compared. The results of the comparison are used to derive a new execution plan. Derivation of a new execution plan can include adding, deleting, updating, and reversing actions from the prior execution plan based actions being included or not included in the current execution plan.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates translating declarative models. As depicted in FIG. 1, computer architecture 100 includes translation system 101 and environment 105. Environment 105 further includes a plurality of resources, such as, for example, resources 105A, 105B, and 105C, that are accessible to translation system 101. As further depicted, translation system 101 receives declarative model 102 and command 103. Translation system 101 translates declarative model 102 in view of command 103 resulting in the performance of actions 104A, 104B, and 104C within environment 105.

Generally, a model is data that describes a subject such as an application module (e.g., a distributable component of a distributed application). Accordingly, declarative model 102 can describe one or more application modules that are connected or related to each other. Each module can be further composed of one or more resources that can also be related to each other. Thus, elements of declarative model 102 can be used to describe related application modules and resources representing at least a portion of a distributed application. For example, declarative model 102 can describe a module of a Web Service that is composed of resources (e.g., files), artifacts (e.g., IIS virtual directories that have to be created to host the Web Service), and configuration information.

Generally, a command represents an operation to be performed on a model. A command can represent virtually any operation, such as, for example, deploy, undeploy, start, stop, update, monitor, etc., that can be performed on a model. Accordingly, command 103 can represent an operation that is to be performed on declarative model 102.

A model along with a command can be utilized to represent intent. The represented intent can be a user intent or automated intent. For example, declarative model 102 along with command 103 can represent a user intent to "deploy my Web Service", "start execution of my Web Service", etc.

Thus, in response to receiving declarative model 102 and command 103, translation system 101 can process model 102 and command 103 to realize the represented intent. Realizing the represented intent can include performing one or more actions, such as, for example, actions 104A, 104B, 104C, etc. to the resources of environment 105. For example, in order to deploy a user's Web Service, the translation system 101 can copy files to resource 105B, create artifacts on resource 105A, such as, for example, create a directory on a Web Server and create or alter resource 105C (e.g., configuration files) required by the Web Service.

Figure 2A:
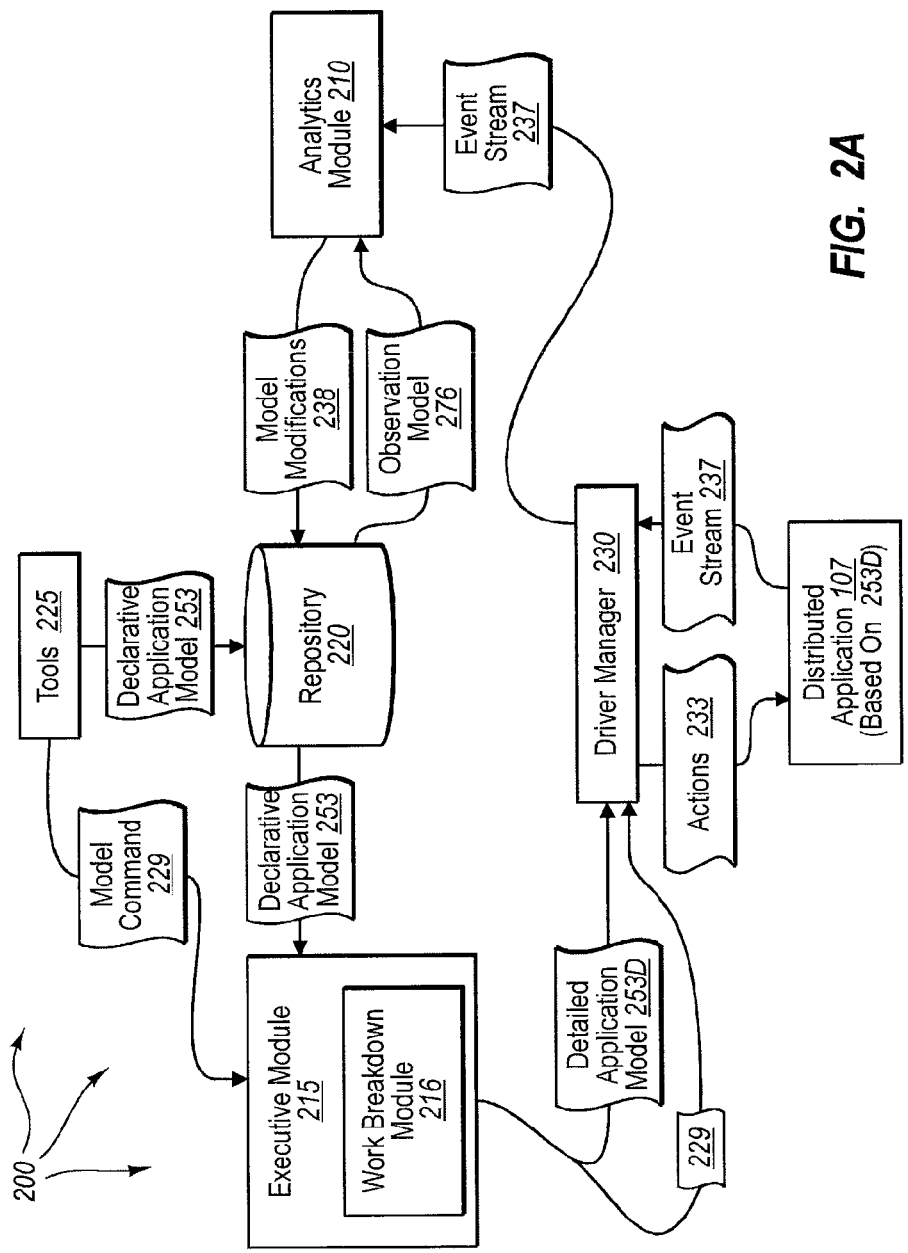
FIGS. 2A-2B illustrate different views of a more detailed computer architecture for translating declarative application models.

FIG. 2A illustrates an example computer architecture 200 that facilitates translating declarative application models. Depicted in computer architecture 200 are tools 225, repository 220, executive module 215, driver manager 230, and analytics module 210. Each of the depicted components can be connected to one another over a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, tools 225 can be used to write declarative models for applications and stored in repository 220, such as, for example, declarative application model 253, in repository 220. Declarative models are used to determine the structure and behavior of real-world running (deployed) applications. A declarative model is also used to determine what events are reported (emitted) from an application that is deployed based on the declarative model. Thus, a user (e.g., a distributed application program developer) can use one or more of tools 225 to create declarative model 253. A declarative model can include a plurality of interrelated model elements that declare how an application is to be configured and executed.

Generally, declarative models include one or more sets of high-level declarations expressing application intent for a distributed application. Thus, the high-level declarations generally describe operations and/or behaviors of one or more modules in the distributed application program. However, the high-level declarations do not necessarily describe implementation steps required to deploy a distributed application having the particular operations/behaviors (although they can if appropriate). For example, a declarative application model 253 can express the generalized intent of a workflow, including, for example, that a first and a second Web service be connected to one another. However, declarative application model 153 does not necessarily describe how (e.g., protocol), nor where (e.g., URI endpoint), the first and second Web service are to be connected to one another. The specific details of how and where two Web services are connected may be determined based on where the Web services are deployed (e.g. specific machines and specific Web server configurations).

Application control for applications based on declarative application models can be realized in response to receiving commands to perform operations on declarative application models. For example, input (e.g., user-initiated input or automated input) can be received by the executive module 215. Input is received from tools 225 or from a computer program at (e.g., a user-interface or a programmatic interface). Input can include a reference to a model (e.g., filename, URL, etc.) and a command. The command represents an operation (e.g., deploy, undeploy, start, stop, update, etc.) that is to be performed on the referenced model.

To perform a requested operation on an application described by a declarative model, the declarative application model is sent to executive module 215. Executive module 215 can refine the declarative application model until there are no ambiguities and the details are sufficient for drivers to consume. Thus, executive module 215 can receive and refine declarative application model 253 so that declarative application model 253 can be translated by drivers residing inside driver managers 230 into a deployed, real-world application.

In general, "refining" a declarative model can include some type of work breakdown structure, such as, for example, progressive elaboration, so that the declarative model instructions are sufficiently complete for translation by drivers or driver manager 230. Since declarative models can be written relatively loosely by a human user (i.e., containing generalized intent instructions or requests), there may be different degrees or extents to which executive module 215 modifies or supplements a declarative model for deploying an application. Work breakdown module 216 can implement a weak breakdown structure algorithm, such as, for example, a progressive elaboration algorithm, to determine when an appropriate granularly has been reached and instructions are sufficient for drivers residing in the driver manager 230.

Executive module 215 can also account for dependencies and constraints included in a declarative model. For example, executive module 215 can be configured to refine declarative application model 253 based on semantics of dependencies between elements in the declarative application model 253 (e.g., one web service connected to another). Thus, executive module 215 and work breakdown module 216 can interoperate to output detailed application model 253D that provides drivers residing in the driver manager 230 with sufficient information to deploy distributed application 207.

In addition, executive module 215 can be configured to fill in missing data regarding computer system assignments. For example, executive module 215 might identify a number of different modules in declarative model 253 that have no requirement for specific computer system addresses or operating requirements. Thus, executive module 215 can assign distributed application program modules to an available computer system. Executive module 215 can reason about the best way to fill in data in a refined declarative application model 253. For example, as previously described, executive component 215 may determine and decide which transport to use for a Web service based on proximity of connection, or determine and decide how to allocate distributed application program modules based on factors appropriate for handling expected spikes in demand. Executive module 215 can then record missing data in detailed application model 253D (or segment thereof). The detailed application model may also be saved in the repository 220.

In addition or alternative embodiments, executive module 215 can be configured to compute dependent data in the declarative application model 253. For example, executive module 215 can compute dependent data based on an assignment of distributed application program modules to machines. Thus, executive module 215 can calculate URI addresses on the endpoints, and propagate the corresponding URI addresses from provider endpoints to consumer endpoints. In addition, executive module 215 may evaluate constraints in the declarative application model 253. For example, the executive component 215 can be configured to check to see if two distributed application program modules can actually be assigned to the same machine, and if not, executive module 215 can refine detailed application model 253D to accommodate this requirement.

After adding all appropriate data (or otherwise modifying/refining) to declarative application model 253 (to create detailed application model 253D), executive component 215 can finalize the refined detailed application model 253D so that it can be translated by platform-specific drivers residing in driver manager 230. To finalize or complete the detailed application model 253D, executive module 215 can, for example, partition a declarative application model into segments that can be targeted to any one or more platform-specific drivers. Thus, executive module 215 can tag each declarative application model (or segment thereof) with its target driver (e.g., the address/ID of a platform-specific driver residing in driver manager 230). Furthermore, executive module 215 can verify that a detailed application model (e.g., 253D) can actually be translated by drivers residing in driver manager 230, and, if so, pass the detailed application model (or segment thereof) to driver manager 230 for dispatching to appropriate drivers for translation.

In any event, driver manager 230 interoperates with one or more drivers and translators to translate detailed application module 253D into one or more (e.g., platform-specific) actions 233. As depicted in FIG. 2A, actions 233 can be used to realize the intent of the operation represented in model command 226 for distributed application 207.

During deployment, distributed application programs can provide operational information about execution. For example, during execution distributed application 207 can emit event stream 237 indicative of events (e.g. execution or performance issues) that have occurred at distributed application 207. In one implementation, distributed application 207 sends out event stream 237 on a continuous, ongoing basis, while, in other implementations, distributed application 207 sends event stream 237 on a scheduled basis (e.g., based on a schedule setup by the platform-specific driver residing in driver manager 230). Driver manager 230, in turn, passes event stream 237 to analytics module 210 for analysis, tuning, and/or other appropriate modifications. The events emitted in event stream 237 are defined in declarative application model 253.

Generally, analytics module 210 aggregates, correlates, and otherwise filters data from event stream 237 based on declarative observation models (e.g., observation model 276) stored in the repository 220 along with declarative application models 253 to identify interesting trends and behaviors of distributed application 207. Analytics module 210 can also automatically adjust the intent of declarative application model 253 as appropriate, based on identified trends. For example, analytics module 210 can send model modifications 238 to repository 220 to adjust the intent of declarative model 253. An adjusted intent, for example, can reduce the number of messages processed per second at a computer system if the computer system is running low on system memory, redeploy distributed application 207 on another machine if the currently assigned machine is rebooting too frequently, etc.

Figure 2B:
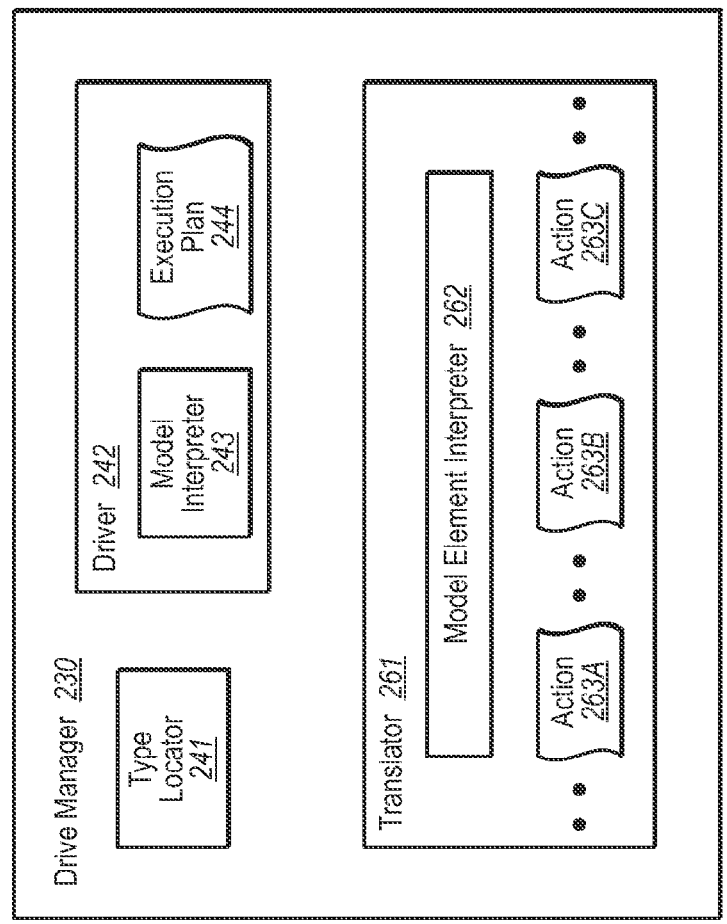

FIG. 2B depicts a more detailed view of components that can be included in driver manager 230. As depicted in FIG. 2B, driver manager 230 includes type locator 241, driver 342, and translator 261.

Type locator 241 is a lookup mechanism that maps models and model elements to corresponding drivers and translators that can process them.

Driver 242 is configured to receive and process a model and a command. Driver 242 is configured for use with a list of commands it understands and a set of technology models that is supports. For example, driver 242 may be a WCF-IIS driver capable of translating a Web Service Module Model that describes a Web Service implemented using Microsoft® Windows Communication Foundation ("WCF") and to be hosted on Microsoft® Internet Information Server ("IIS").

As depicted, driver 242 includes model interpreter 243 that produces execution plan 244. Model interpreter 243 is configured to parse a received model and generate a corresponding execution plan (e.g., execution plan 244). To generate an execution plan from a received model, model interpreter 243 can identify a model's constituent model elements and their relationships to one another. Model interpreter 243 can then call corresponding model element interpreters to retrieve a sequence of actions for each model element. Model interpreter 243 combines the sequence of actions for each model element into a single sequence of actions for inclusion in an execution plan.

Thus, for example, execution plan 244, is a sequenced set of actions that can be executed to perform an operation on a model. Execution plan 244 also provides an execution context containing model information that can be used by the actions during their execution. The context is also used by the actions to pass on information required by other actions during execution.

Translator 261 is a package of a set of related actions and a model element interpreter. Translator 261 bundles together procedures that have an affinity towards a specific technology. For example, an OSConfig Translator would have a set of actions that can process operating system artifacts such as files and folders. The actions could be create, copy, move, delete and so on.

As depicted, translator 261 includes model element interpreter 262 and actions 263A, 263B, and 263C. Model element interpreter 262 is configured to parse model elements and assembles a sequence of actions that can be executed to operate on whatever is represented by the model element.

Actions 263A, 263B, and 263C represent executable procedures that operate based on a single model element. For example, a CopyFile action can copy a given file to a given destination where the file is described by a resource model element in a model describing an application module such as a Web service.

An action can include a variety of different properties. For example, an action can be Idempotent. That is, the same action successfully executed again on the same model element will have the same result. An action can have a unique identifier. If two actions are to do the same, the two actions can have same identifiers. For example, two actions that install a file can have the same identifier when the file has the same absolute path.

An action can be associated with a corresponding reverse action. The reverse action can undo the effects of the action. For example, the reverse of a CopyFile would be a procedure that removes a file or restores an original file that was overwritten. An action can be associated with a corresponding update action that applies a newer version of a resource over an existing resource.

Accordingly, the components and data depicted in FIG. 2B can interoperate to realize an intent represented in a received model and command.

Figure 3:
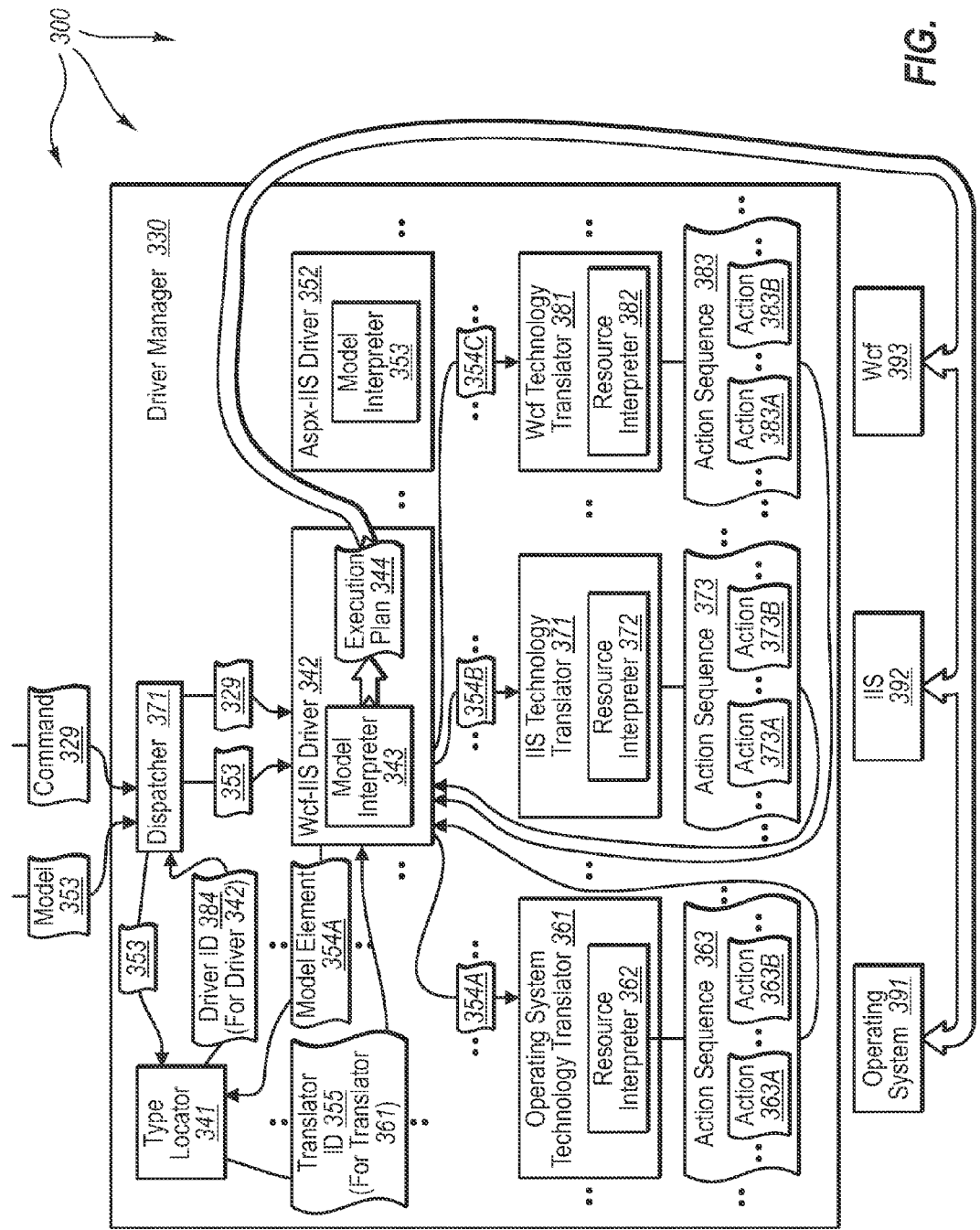
FIG. 3 illustrates a further expanded view of a computer architecture for translating declarative application models.

FIG. 3 illustrates a further expanded view of an example computer architecture 300 for translating declarative application models. As depicted, computer architecture 300 includes driver manager 330. Driver manager 330 can be configured similarly to (or even the same as) driver manger 230 depicted in computer architecture 200. Driver manager 330 hosts drivers and translators and receives inputs. For example, driver manager 300 hosts a plurality of drivers, such as, for example, wcf-IIS driver 342 and Aspx-IIS driver 352.

Each driver can include a model interpreter (e.g., model interpreters 343 and 353 respectively) configured to parse a model and generate an execution plan. Thus, upon receiving a model, each driver can identify constituent resources and their relationships to one another, call appropriate resource interpreters to retrieve sequences of actions, and assemble sequences of actions into an execution plan.

Driver manager 300 also hosts a plurality of translators, such as, for example, operating system technology translator 361, IIS technology translator 371, and WCF technology translator 381. Each translator can include a resource interpreter (e.g., resource interpreters 362, 372, and 382 respectively) for parsing model elements describing a resource and assembling a sequence of actions that can be executed on what the resource represents. Each translator can correspond to a portion of the environment. For example, operating system technology translator 361 corresponds to operating system 391, IIS technology translator 371 corresponds to IIS 392, and WCF technology transfer 381 corresponds to WCF 393.

Accordingly, when a translator receives a model element describing a resource the resource represents some object within the corresponding portion of the environment. For example, when operating system technology translator 361 receives a resource the resource corresponds to an object in operating system 391 (e.g., a service.svc file). Similarly, when IIS technology translator 371 receives a resource the resource corresponds to an object in IIS 392 (e.g., the location of a user's Web service—"/myservice"). Likewise, when WCF technology translator 381 the resource corresponds to an object in WCF 393 (e.g., a Web.config).

Generally, dispatcher 371 is configured to receive a model and command and dispatch the model and command to the appropriate driver. Thus, upon receiving a model and command, dispatcher 371 can forward the model to type locator 341. Type locator 341 can receive the model and based on the model locate the appropriate type of driver for processing the model. Type locator 341 can return a driver ID identifying the appropriate type of drive back to dispatcher 371. Dispatcher 371 can then use the driver ID to dispatch the model and command to the identified appropriate driver.

Drivers can also utilize type locator 341 to locate appropriate translators for model element describing resources included in a model. For each model element describing resource in a model, a driver can submit the model element describing resource to type locator 341. Type locator 341 can receive the model element describing resource and based on the model element describing resource locate the appropriate type of translator for translating the model element describing resource. Type locator 341 can return a translator ID identifying the appropriate type of translator back to the driver. The driver can then use the translator ID to dispatch the model element describing resource to the identified appropriate translator The appropriate translator parses the received model element describing resource to assemble a sequence of actions for a received command and returns the sequence of actions back to the driver. The driver then assembles the different sequences of actions into a single execution plan. The driver then executes the execution plan. Actions in the execution plan are executed in sequence, operating directly on the environment (e.g., on one or more of operating system 391, IIS 391, and WCF 392), to realize the intent collectively represented in model 353 and command 329.

Figure 4:
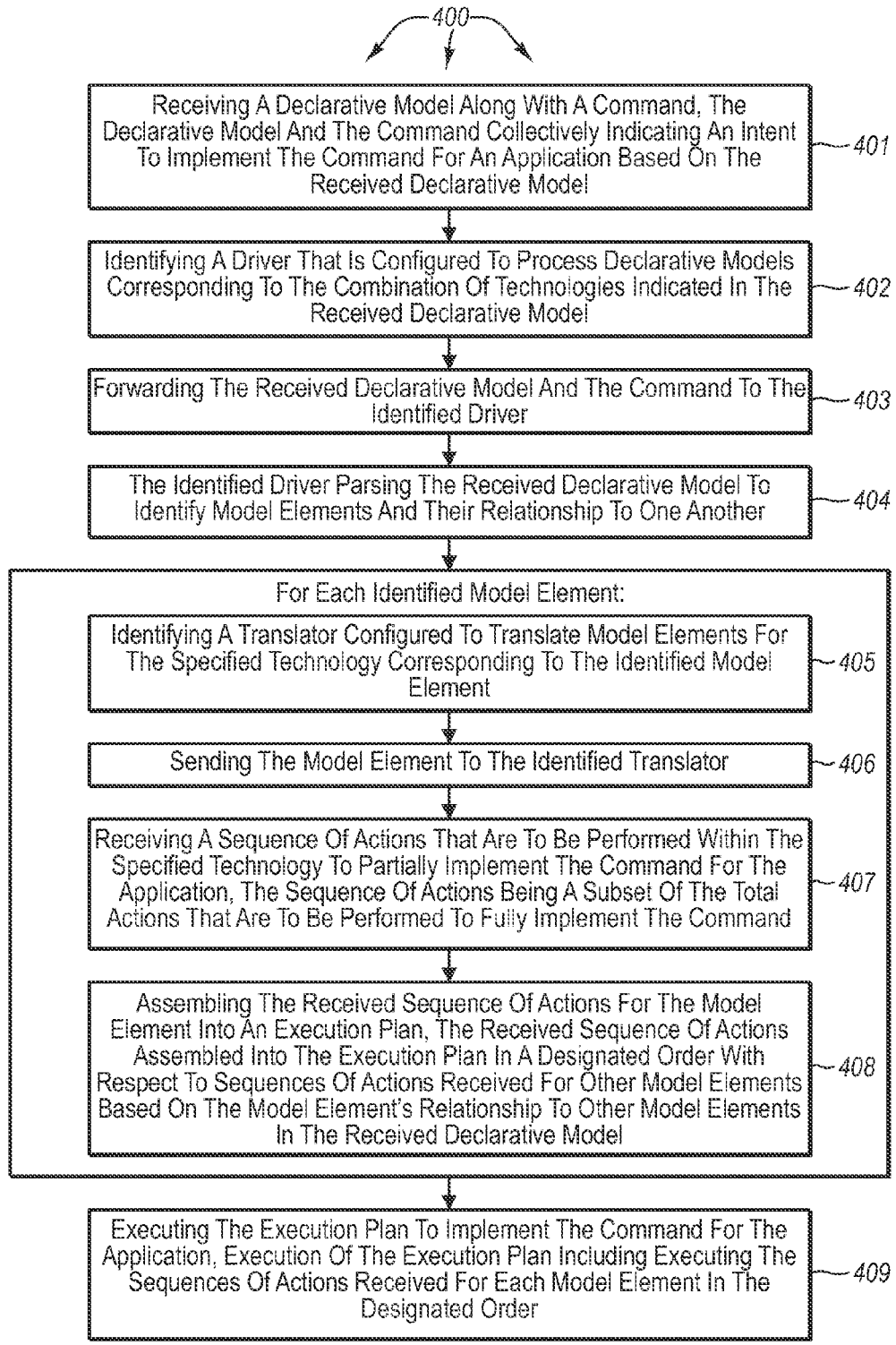
FIG. 4 illustrates a flow chart of an example method for translating a model to implement a received command.

FIG. 4 illustrates a flow chart of an example method 400 for translating a model to implement a received command. Method 400 will be described with respect to the components and data in computer architecture 300.

Method 400 includes an act of receiving a declarative model along with a command, the declarative model and the command collectively indicating an intent to implement the command for an application based on the received declarative model (act 401). For example, dispatcher 371 can receive model 353 and command 329. Model 353 can include a plurality of interrelated model elements declaring how to configure and execute an application. Command 329 can be a command to deploy, undeploy, start, stop, etc., the application.

Method 400 includes an act of identifying a driver that is configured to process declarative models corresponding to the combination of technologies indicated in the received declarative model (act 402). For example, dispatcher 371 can send model 353 to type locator 341. Type locator 341 can receive model 353. Type locator 341 can process model 353 to determine the type of driver appropriate for processing model 353.

Determining the type of driver can be based on the combination of technologies (e.g., a combination of operating system, network protocols, data types, etc.) indicated in and/or related to model elements of model 353. For example, type locator 341 can determine that Wcf-IIS driver 342 is the appropriate driver for processing model 353 based on model elements contained in model 353 relating to IIS 392 and WCF 393. In response to the determination, type locator 341 can send driver ID 384 (an identifier for driver 342) to dispatcher 371.

Method 400 includes an act of forwarding the received declarative model and the command to the identified driver (act 403). For example, dispatcher 371 can utilize driver ID 384 to forward model 353 and command 329 to Wcf-IIS driver 342.

Method 400 includes an act of the identified driver parsing the received declarative model to identify model elements and their relationship to one another (act 404). Model interpreter 343 can parse model 353 to identify model elements within model 353 and the model elements' relationships to one another. For example, model interpreter 343 can identify model element 354A, 354B, 354C, etc.

For each identified model element, method 400 includes an act of identifying a translator configured to translate model elements for the specified technology corresponding to the identified model element (act 405). For example, Wcf-IIS driver 342 can send identified model elements, such as, for example, model element 354A, to type locator 341. Type locator 341 can receive model element 354A. Type locator can process model element 354A to determine the type of translator appropriate for translating model element 354A.

Determining the type of translator can be based on a specified technology (e.g., one of an operating system, network protocol, data type, etc.) indicated in and/or related to model element 354A. For example, type locator 341 can determine that operating system technology translator 361 is the appropriate driver for translating model element 354A based on model element 354A indicating or being related to operating system 391. In response to the determination, type locator 341 can send translator ID 355 (an identifier for translator 361) to Wcf-IIS driver 342. Similar determinations can be made for model elements 354B, 354C, etc. included in model 353.

For each identified model element, method 400 includes an act of sending the model element to the translator (act 406). For example, Wcf-IIS driver 342 can utilize translator ID 355 to forward model element 354A to operating system technology translator 361. Resource interpreter 362 can translate model element 354A into action sequence 363. Action sequence 363 includes a plurality of actions, such as, for example, actions 363A, 363B. etc, that are to be executed in operating system 391 to implement a portion of the intent of command 329.

Similarly, Wcf-IIS driver 342 can utilize an appropriate translator ID to forward model element 354B to IIS technology translator 371. Resource interpreter 372 can translate model element 354B into action sequence 373. Action sequence 373 includes a plurality of actions, such as, for example, actions 373A, 373B. etc, that are to be executed in IIS 392 to implement another portion of the intent of command 329.

Likewise, Wcf-IIS driver 342 can utilize an appropriate translator ID to forward model element 354C to WCF technology translator 381. Resource interpreter 382 can translate model element 354C into action sequence 383. Action sequence 383 includes a plurality of actions, such as, for example, actions 383A, 383B. etc, that are to be executed in WCF 393 to implement further portion of the intent of command 329.

Further model elements can also be sent to any of operating system technology translator 361, IIS technology translator 371, WCF technology translator 381, as well as to other appropriate technology translators (not shown), based on a model element indicating and/or being related to a specified technology.

For each identified model element, method 400 includes an act of receiving a sequence of actions that are to be performed within the specified technology to partially implement the command for the application, the sequence of actions being a subset of the total actions that are to be performed to fully implement the command (act 407). For example, model interpreter 343 can receive action sequence 363 from operating system technology translator 361, action sequence 373 IIS technology translator 371, action sequence 383 WCF technology translator 381, etc. Each action sequence is a subset of the total actions that are to be performed to fully implement command 329 for an application based on model 353.

For each identified model element, method 400 includes an act of assembling the received sequence of actions for the model element into an execution plan, the received sequence of actions assembled into the execution plan in a designated order with respect to sequences of actions received for other model elements based on the model element's relationship to other model elements in the received declarative model (act 408). For example, model interpreter 343 can assemble action sequences 363, 373, 383, etc. into execution plan 344. Action sequences 363, 373, 383, etc., are assembled in a designated order based on the relationship between corresponding model elements in model 353.

Method 400 includes an act of executing the execution plan to implement the command for the application, execution of the execution plan including executing the sequences of actions received for each model element in the designated order (act 409). For example, Wcf-IIS driver 342 can execute execution plan 344 to implement command 329 for an application (based on model 353) that is to use portions of operating system 391, IIS 392, and WCF 393, etc.

Figure 5:
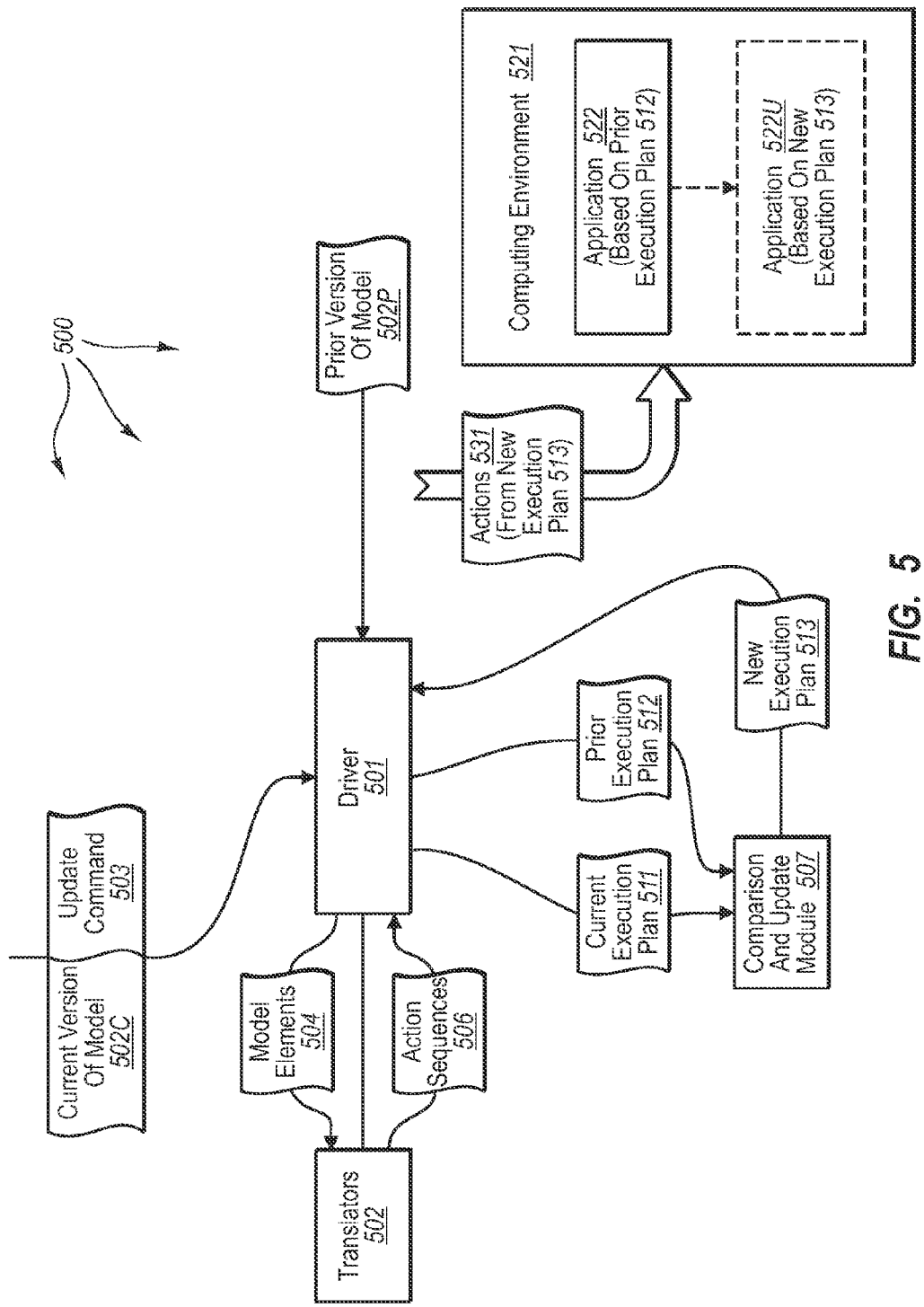
FIG. 5 illustrates an example of a computer architecture for translating declarative application models to update an application.

FIG. 5 illustrates an example of a computer architecture 500 for translating declarative application models to update an application. As depicted, computer architecture 500 includes driver 501, translators 502, and comparison and update module 507. Within computer architecture 500 and as previously described, driver 501 can receive models (e.g., current version of model 502C and prior version of model 502P) and commands (e.g., update command 503), parse out model elements (e.g., model elements 504), send the model elements to an appropriate translator in translators 502, and receive back action sequences (e.g., action sequences 506) from the appropriate translators. From the action sequences, driver 501 can create execution plans, such as, for example, current execution plan 511 and prior execution plan 512

Comparison and update module 507 is configured to receive a current execution plan and a prior execution plan for an application and compare the two execution plans to identify differences in action sequences within the two execution plans. From identified differences, comparison and update module 507 can apply actions in a current execution plan to actions in prior execution pan to derive a new execution plan. A new execution plan can include update actions for updating an existing application.

Figure 6:
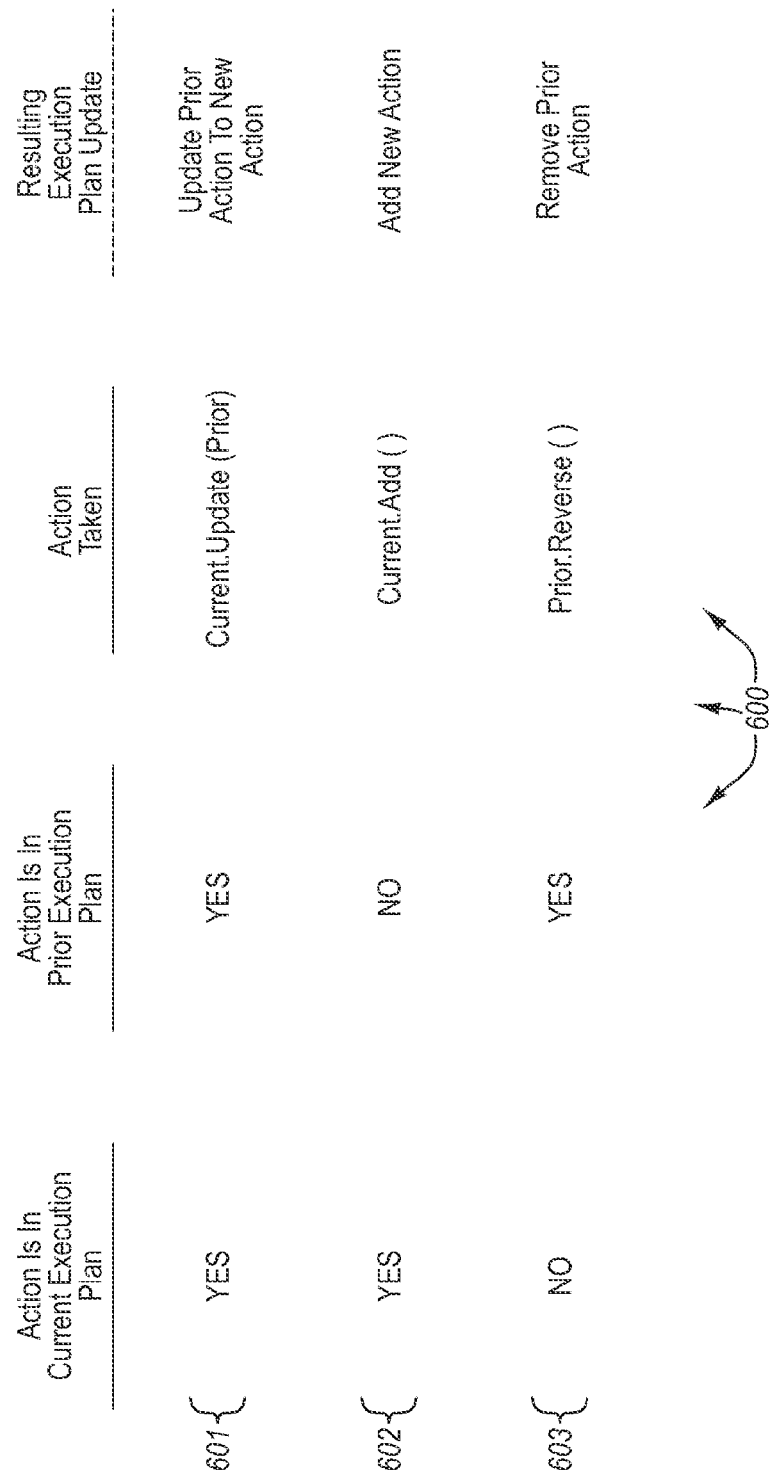
FIG. 6 illustrates examples of update actions for updating application.

FIG. 6 illustrates examples of update actions 600 for updating an application. Row 601 indicates that when an action is included in both a current version and a prior version of an execution plan, an update action is included in the new execution plan to update the effects of the execution of the prior version of the action to the effects of the current version of the action. Row 602 indicates that when an action is included only in a current version of an execution plan, the current version of the action is added to the new execution plan. Row 603 indicates that when an action is included only in a prior version of an execution plan, a reverse action is included in the new execution plan to remove the effects of the execution of the prior version of the action.

Figure 7:
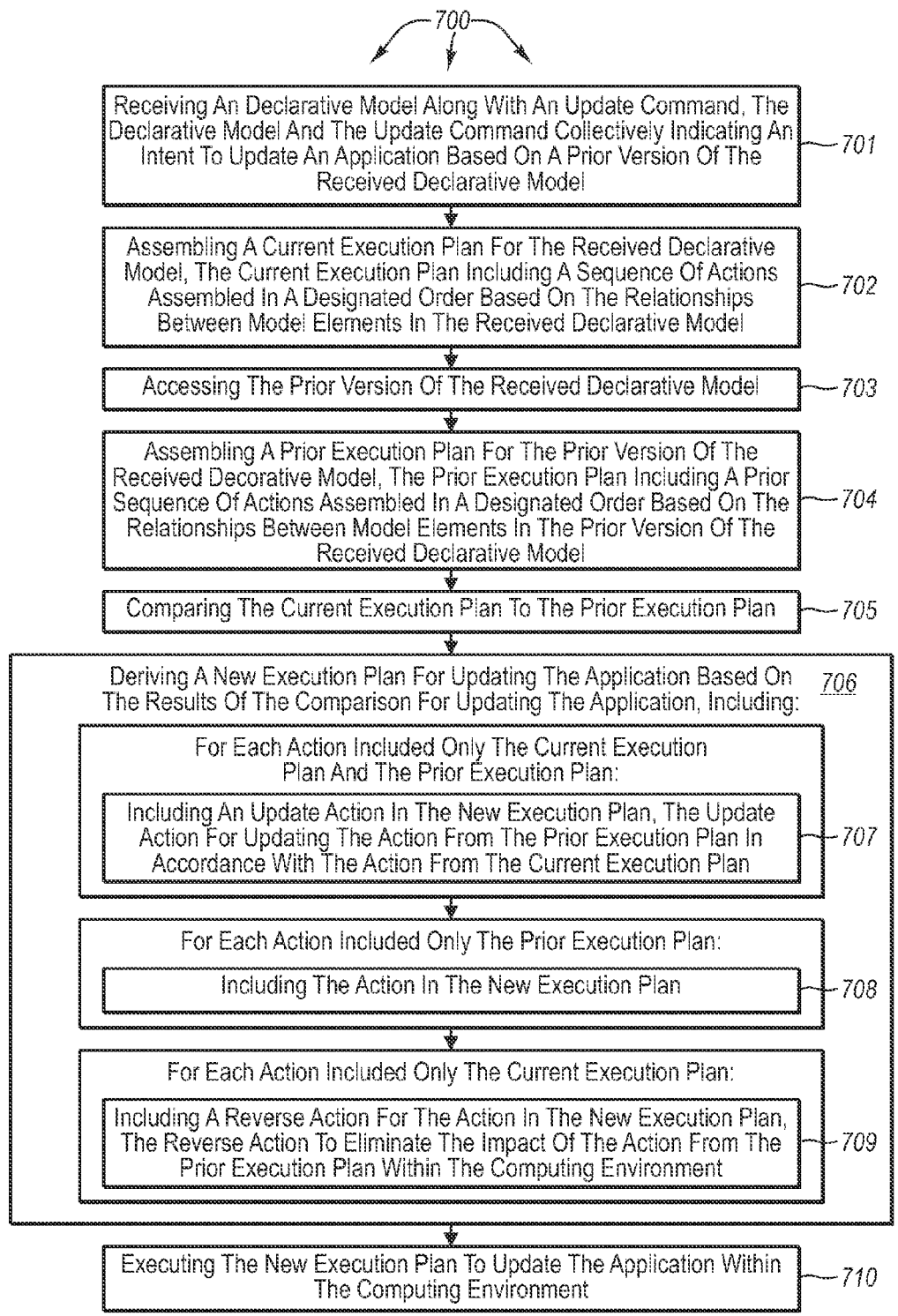
FIG. 7 illustrates a flow chart of an example method for translating models to implement an update command.

FIG. 7 illustrates a flow chart of an example method 700 for translating models to implement an update command. Method 700 will be described with respect to components and data in computer architecture 500 and update actions 600.

Method 700 includes an act of receiving a declarative model along with an update command, the declarative model and the update command collectively indicating an intent to update an application based on a prior version of the received declarative model (act 701). For example, driver 501 can receive current version of model 502C and update command 503. Current version of model 502C and update command 503 collectively represent an intent to update application 522.

Method 700 includes an act of assembling a current execution plan for the received declarative model, the current execution plan including a sequence of actions assembled in a designated order based on the relationships between model elements in the received declarative model (act 702). For example, driver 501 can parse model elements from current version of model 502C and send the model elements (e.g., included in model elements 504) to appropriate translators in translators 502. The appropriate translators can return action sequences (e.g., included in action sequences 506). From the action sequences driver 501 can assemble current execution plan 511.

Method 700 includes an act of accessing the prior version of the received declarative model (act 703). For example, driver 501 can access prior version of model 502P. Application 522 is based on prior version of model 502P.

Method 700 includes an act of assembling a prior execution plan for the prior version of the received decorative model, the prior execution plan including a prior sequence of actions assembled in a designated order based on the relationships between model elements in the prior version of the received declarative model (act 704). For example, driver 501 can parse model elements from prior version of model 502P and send the model elements (e.g., included in model elements 504) to appropriate translators 502. The appropriate translators can return action sequences (e.g., included in action sequences 506). From the action sequences driver 501 can assemble prior execution plan 512.

Method 700 includes an act of comparing the current execution plan to the prior execution plan (act 705). For example, comparison and update module 507 can compare current executing pan 511 to prior execution plan 512. From the comparison, comparison and update module 507 can determine if actions are included in one or both of current executing plan 511 and prior execution plan 512.

Method 700 includes an act of deriving a new execution plan for updating the application based on the results of the comparison (act 706). For example, comparison and update module 507 can derive new execution plan 513 for updated application 522 based on the results of comparing current execution plan 511 to prior execution plan 512.

Derivation of a new execution plan can include inserting update, current, or reversal actions into the new execution plan. For example, for each action included in both the current execution plan and the prior execution plan, an update action is included in the new execution plan (act 707). For each action included only the current execution plan, the action from the current execution plan is included in the new execution plan (act 708). For each action included only the prior execution plan, a reverse action for reversing the action in prior execution plan is included the new execution plan (act 709). The reverse action is to eliminate the impact of the action from the prior execution plan within computing environment 521.

Method 700 includes an act of executing the new execution plan to update the application within the computing environment (act 710). For example, driver 501 can execute new execution plan 513. Execution of new execution plan 513 can cause actions 531 to be emitted into computing environment 521. Actions 531 can be implemented in computing environment to update application 522 to application 522U.

Embodiments of the present invention are also extensible. Drivers can register with a Type Locator (e.g., 341) to expose functionality to a dispatcher. Similarly, translators can register with a Type Locator to expose functionality to drivers. Drivers can reuse existing translators. For example, referring to FIG. 3, Aspx-IIS driver 352 can use operating system technology translator 361 and IIS technology translator 371 (along with an Aspx translator (not shown)) to process model elements.

Embodiments can provide base classes and generic implementations for Driver, Model interpreter, Model Element interpreter and Action. Thus, the infrastructure for creating and running execution Plans, locating types and generating update plans are all provided through a common framework. As a result, a developer can focus on creating a new model, and Translators focused on processing model elements into Actions. The base classes can optionally be extended to create the Model and Model element interpreters to handle cases where relationships are not expressed in the model, thus potentially preventing the base implementations from inferring the action sequence.

Accordingly, embodiments of the present invention facilitate processing declarative models to perform various operations on applications, such as, for example, application deployment, application updates, application control such as start and stop, application monitoring by instrumenting the applications to emit events, and so on. Declarative models of applications are processed and realized onto a target environment, after which they can be executed, controlled, and monitored.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system within a computing environment, the computing environment including a plurality of different technologies, the computer system including one or more drivers, each driver configured to process models for a specified combination of different technologies, the computer system including one or more translators, each translator configured to process model elements representing objects within a specified technology from among the plurality of different technologies, a method for translating a model to implement a received command within the computing environment, the method comprising:

an act of receiving a declarative model along with a command, the declarative model and the command collectively indicating an intent to implement the command for an application based on the received declarative model;

an act of identifying a driver that is configured to process declarative models corresponding to the combination of technologies indicated in the received declarative model;

an act of forwarding the received declarative model and the command to the identified driver;

an act of the identified driver parsing the received declarative model to identify model elements and their relationship to one another;

for each identified model element:

an act of identifying a translator configured to translate model elements for the specified technology corresponding to the identified model element;

an act of sending the model element to the identified translator;

an act of receiving a sequence of actions that are to be performed within the specified technology to partially implement the command for the application, the sequence of actions being a subset of the total actions that are to be performed to fully implement the command; and an act of assembling the received sequence of actions for the model element into an execution plan, the received sequence of actions assembled into the execution plan in a designated order with respect to sequences of actions received for other model elements based on the model element's relationship to other model elements in the received declarative model; and an act of executing the execution plan to implement the command for the application, execution of the execution plan including executing the sequences of actions received for each model element in the designated order.

2. The method as recited in claim 1, wherein an act of receiving a declarative model along with a command comprises an act of receiving a command to deploy an application based on the declarative model.

3. The method as recited in claim 1, wherein an act of receiving a declarative model along with a command comprises an act of receiving a command to undeploy an application based on the declarative model.

4. The method as recited in claim 1, wherein an act of receiving a declarative model along with a command comprises an act of receiving a command to start an application based on the declarative model.

5. The method as recited in claim 1, wherein an act of receiving a declarative model along with a command comprises an act of receiving a command to stop an application based on the declarative model.

6. The method as recited in claim 1, wherein an act of receiving a declarative model along with a command comprises an act of receiving a command to initiate or terminate monitoring of an application based on the declarative model.

7. The method as recited in claim 1, wherein an act of receiving a declarative model along with a command comprises an act of receiving a command to update an application based on the declarative model.

8. The method as recite in claim 1 wherein the act of receiving a sequence of actions that are to be performed within the specified technology comprises an act of receiving a sequence of idempotent actions.

9. A computer program product for use at a computer system within a computing environment, the computing environment including a plurality of different technologies, the computer system including one or more drivers, each driver configured to process models for a specified combination of different technologies, the computer system including one or more translators, each translator configured to process model elements representing objects within a specified technology from among the plurality of different technologies, the computer program product for implementing a method for translating a model to implement a received command within the computing environment, the computer program product comprising one or more physical storage media having stored thereon computer-executable instructions that, when executed at a processor, cause the computer system to perform the method including the following:

receive a declarative model along with a command, the declarative model and the command collectively indicating an intent to implement the command for an application based on the received declarative model;

identify a driver that is configured to process declarative models corresponding to the combination of technologies indicated in the received declarative model;

forward the received declarative model and the command to the identified driver;

parse the received declarative model to identify model elements and their relationship to one another;

for each identified model element:

identify a translator configured to translate model elements for the specified technology corresponding to the identified model element;

send the model element to the translator;

receive a sequence of actions that are to be performed within the specified technology to partially implement the command for the application, the sequence of actions being a subset of the total actions that are to be performed to fully implement the command; and assemble the received sequence of actions for the model element into an execution plan, the received sequence of actions assembled into the execution plan in a designated order with respect to sequences of actions received for other model elements based on the model element's relationship to other model elements in the received declarative model; and execute the execution plan to implement the command for the application, execution of the execution plan including executing the sequences of actions received for each model element in the designated order.

10. The computer program product recited in claim 9, wherein computer-executable instructions that, when executed, cause the computer system to receive a declarative model along with a command comprise computer-executable instructions that, when executed, cause the computer system to receive a command to deploy an application based on the declarative model.

11. The computer program product recited in claim 9, wherein computer-executable instructions that, when executed, cause the computer system to receive a declarative model along with a command comprise computer-executable instructions that, when executed, cause the computer system to receive a command to undeploy an application based on the declarative model.

12. The computer program product recited in claim 9, wherein computer-executable instructions that, when executed, cause the computer system to receive a declarative model along with a command comprise computer-executable instructions that, when executed, cause the computer system to receive a command to start an application based on the declarative model.

13. The computer program product recited in claim 9, wherein computer-executable instructions that, when executed, cause the computer system to receive a declarative model along with a command comprise computer-executable instructions that, when executed, cause the computer system to receive a command to stop an application based on the declarative model.

14. The computer program product recited in claim 9, wherein computer-executable instructions that, when executed, cause the computer system to receive a declarative model along with a command comprise computer-executable instructions that, when executed, cause the computer system to receive a command to initiate or terminate monitoring of an application based on the declarative model.

15. The computer program product recited in claim 9, wherein computer-executable instructions that, when executed, cause the computer system to receive a declarative model along with a command comprise computer-executable instructions that, when executed, cause the computer system to receive a command to update an application based on the declarative model.

16. The computer program product recited in claim 9, wherein computer-executable instructions that, when executed, cause the computer system to receive a sequence of actions that are to be performed within the specified technology comprise computer-executable instructions that, when executed, cause the computer system to receive a sequence of idempotent actions.

17. At a computer system within a computing environment, the computing environment including a plurality of different technologies, the computer system including one or more drivers, each driver configured to process models for a specified combination of different technologies, the computer system including one or more translators, each translator configured to process model elements representing objects within a specified technology from among the plurality of different technologies, a method for updating a model based application within the computing environment, the method comprising:

an act of receiving an declarative model along with an update command, the declarative model and the update command collectively indicating an intent to update an application based on a prior version of the received declarative model;

an act of assembling a current execution plan for the received declarative model, the current execution plan including a sequence of actions assembled in a designated order based on the relationships between model elements in the received declarative model;

an act of accessing the prior version of the received declarative model;

an act of assembling a prior execution plan for the prior version of the received decorative model, the prior execution plan including a prior sequence of actions assembled in a designated order based on the relationships between model elements in the prior version of the received declarative model;

an act of comparing the current execution plan to the prior execution plan;

an act of deriving a new execution plan for updating the application based on the comparison; and an act of executing the new execution plan to update the application within the computing environment.

18. The method as received in claim 17, wherein the act of deriving a new execution plan for updating the application based on the comparison comprises an act of including an update action in the new execution plan for at least one action included in both the current execution plan and the prior execution plan, the update action for updating the action from the prior execution plan in accordance with the action from the current execution plan.

19. The method as recited in claim 17, wherein the act of deriving a new execution plan for updating the application based on the comparison comprises including at least one action included only in the current execution plan in the new execution plan.

20. The method as recited in claim 17, wherein the act of deriving a new execution plan for updating the application based on the comparison comprises including a reverse action in the new execution plan for at least one action included only in the prior execution plan, the reverse action to eliminate the impact of the at least one action within the computing environment.

* * * * *

UNITED STATES PATENT AND TRADEMARK OFFICE
CERTIFICATE OF CORRECTION

| | | |
|---|---|---|
| PATENT NO. | : 8,099,720 B2 | |
| APPLICATION NO. | : 11/925201 | |
| DATED | : January 17, 2012 | |
| INVENTOR(S) | : Igor Sedukhin et al. | |

It is certified that error appears in the above-identified patent and that said Letters Patent is hereby corrected as shown below:

In column 16, line 27, in Claim 8, delete "recite" and insert -- recited --, therefor.

In column 18, line 14, in Claim 17, delete "an declarative" and insert -- a declarative --, therefor.

In column 18, line 27, in Claim 17, delete "decorative" and insert -- declarative --, therefor.

In column 18, line 38, in Claim 18, delete "received" and insert -- recited --, therefor.

Signed and Sealed this
Twenty-sixth Day of June, 2012

David J. Kappos
*Director of the United States Patent and Trademark Office*